United States Patent

[11] 3,622,193

| [72] | Inventor | Leo Schmidt<br>8500 Second St., Alburquerque, N. Mex. 87114 |
|---|---|---|
| [21] | Appl. No. | 863,981 |
| [22] | Filed | Oct. 6, 1969 |
| [45] | Patented | Nov. 23, 1971 |

[54] COLLAPSIBLE CAMPER
4 Claims, 5 Drawing Figs.

[52] U.S. Cl. .................................................. 296/23, 296/27, 52/69
[51] Int. Cl. .................................................. B60p 3/34
[50] Field of Search ........................................... 296/23, 27; 52/69, 71

[56] References Cited
UNITED STATES PATENTS

| 3,050,331 | 8/1962 | Mansen .................. | 296/27 |
| 3,321,233 | 5/1967 | Davis .................. | 296/23 MC |
| 3,409,154 | 11/1968 | Rasmussen .................. | 214/515 |
| 3,488,085 | 1/1970 | Wallace .................. | 296/27 |

*Primary Examiner*—Philip Goodman
*Attorneys*—Clarence A. O'Brien and Harvey B. Jacobson ABSTRACT: A camper structure having a collapsible roof and adapted to be hauled in a pickup vehicle. The roof includes a top member normally contacting the sidewalls of the camper when minimum clearance is required. A bellows is peripherally disposed between the top member and sidewalls thereby allowing the raising of the top member in a sealed manner. Telescoping jacks are pivotally mounted to the camper sidewalls and are rotated to contact the ground for supporting the camper during nonuse when the pickup vehicle slides out from under the camper. The jacks can be rotated to engage the roof and are adjusted so that the roof can be maintained in an elevated condition.

Leo Schmidt
INVENTOR.

Leo Schmidt
INVENTOR.

COLLAPSIBLE CAMPER

The present invention relates to a camper having a collapsible roof structure.

Several inventions exist that include a collapsing roof structure connected to the sidewalls of a camper by means of bellows. These structures generally include brace members that are adjusted upwardly to fix a roof member in an elevated position. Several of these campers are designed to fit into a pickup truck so that they may be conveniently hauled from place to place. Jacks can be utilized to retain the camper in a supported position during nonuse when the pickup vehicle rides out from under the camper. The prior art devices require separate supports for maintaining the roof in an elevated position and for loading and unloading the camper from the pickup vehicle. The necessity for having both types of supports increases the cost to the user as well as requiring additional storage space. Also, in prior art devices, the means for supporting the roof in an elevated position is generally disposed inside the camper sidewalls resulting in a decrease of space in the interior.

The present invention is an improvement upon these collapsible campers. The primary contribution of the present invention is to connect jacks to the sidewalls of the camper so that they can be pivotally rotated to engage the ground and act as supports when the pickup vehicle is moved from under the camper. Also, these jacks can be rotated upwardly to engage a roof member and support the roof member in an elevated position. Thus, the jacks of the present invention make it unnecessary to have separate supports for (1) loading and unloading, and (2) a roof support.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
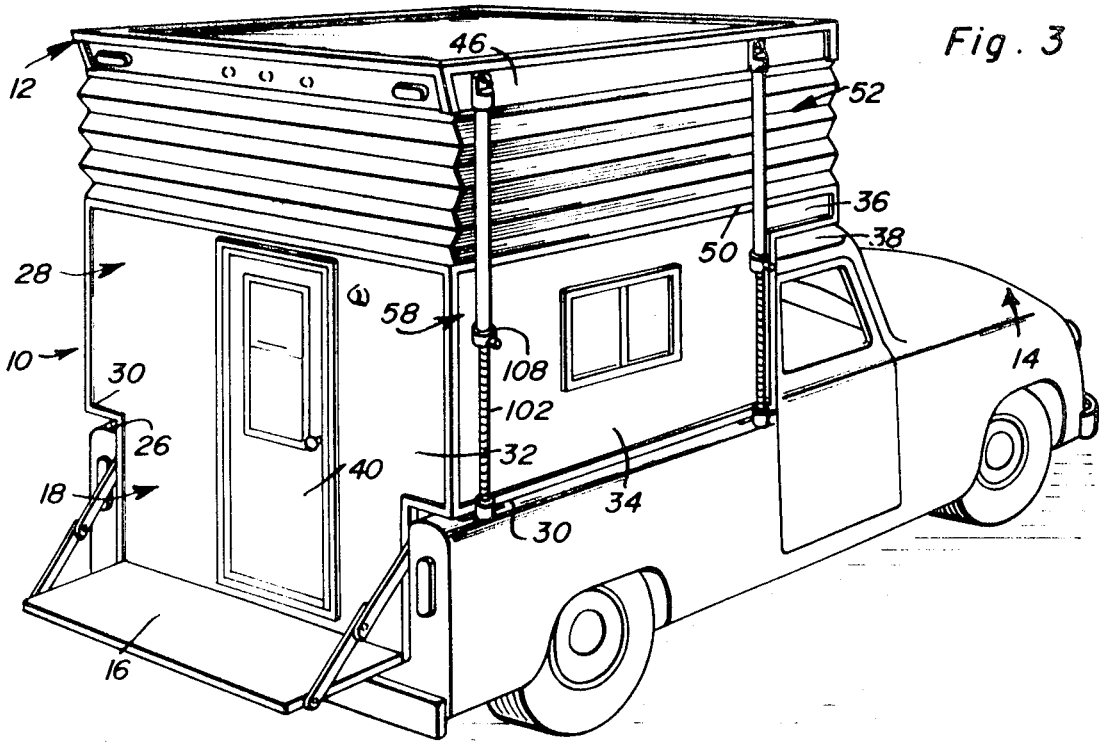
FIG. 3 is a perspective view illustrating the roof member of the camper in an elevated position.

Referring to the drawings and more particularly FIG. 3 thereof, a camper 10 having a collapsible and expandible roof assembly 12 is seen to be mounted in a pickup truck 14 in the usual manner. Generally, appropriate pickup trucks include a drop gate 16 which provides ingress and egress of the camper structure into the storage compartment of the pickup truck.

Figure 1:
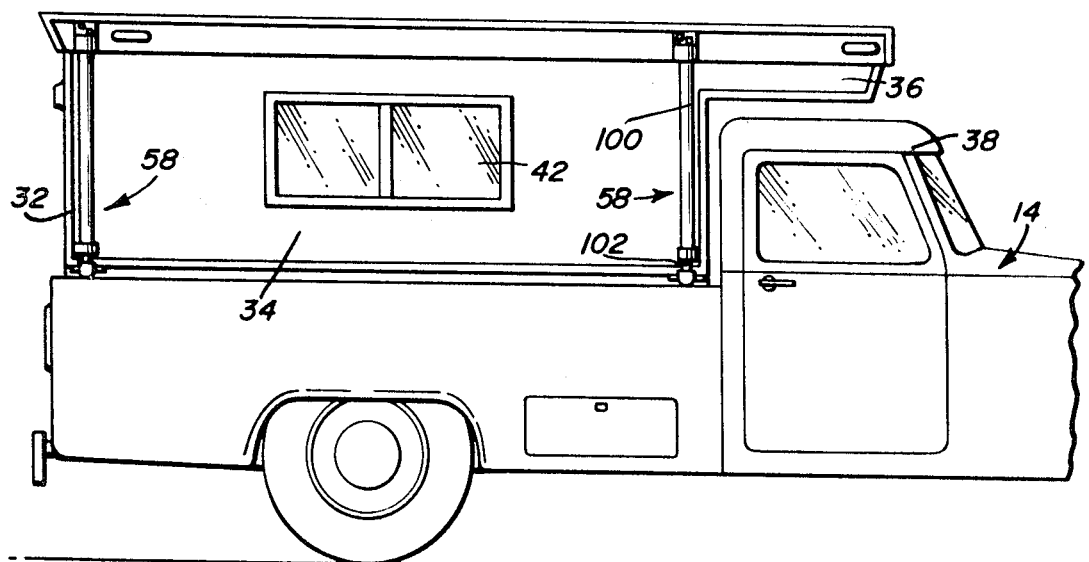
FIG. 1 is a side elevational view illustrating the present camper in a pickup vehicle.
Figure 2:
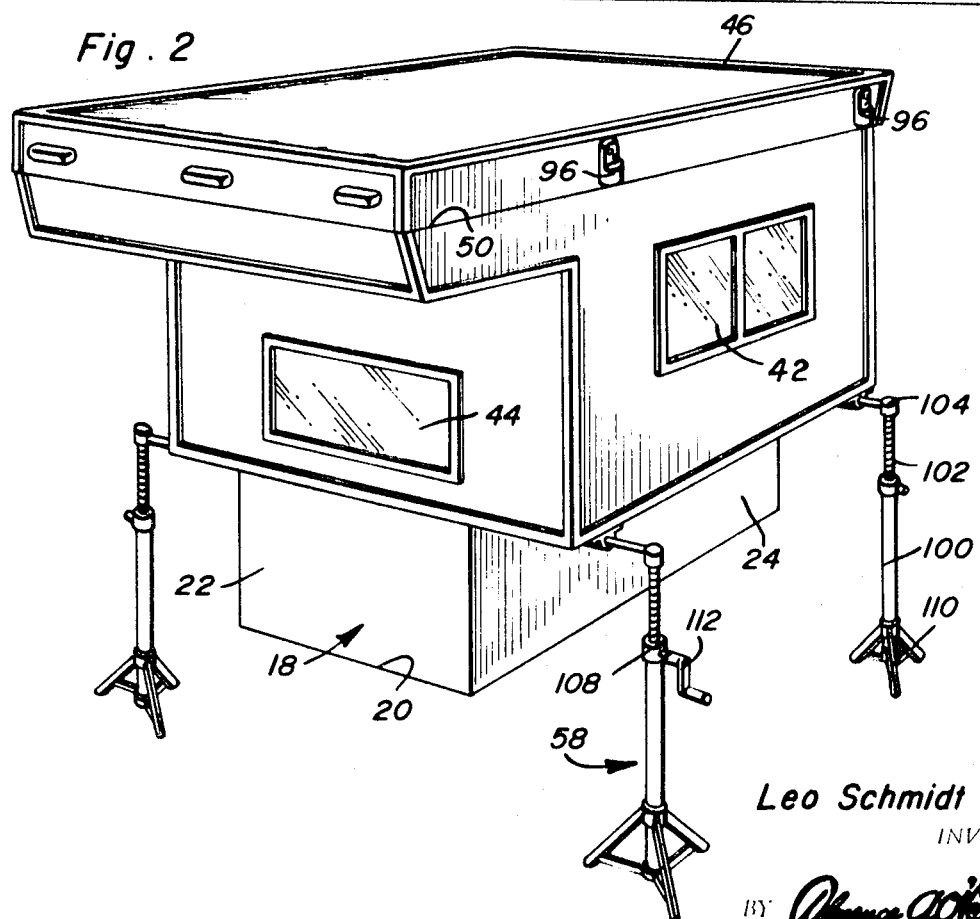
FIG. 2 is a perspective view illustrating the camper in a raised position on supporting jacks after the pickup vehicle is moved from under the camper.

Considering FIG. 2, the camper includes a lower boxlike portion 18 having a base 20 adapted to be supported by the floor of the pickup truck storage compartment. The lower portion includes transverse ends 22 and lateral ends 24 which normally bound the sidewalls of the pickup truck storage compartment.

Referring again to FIG. 3, the vehicle 14 is seen to include the usual storage compartment upper edge 26 located adjacently below a shoulder 30 separating an enlarged upper portion 28 of the camper and the lower narrow portion 18.

In detail, the rearward transverse ends 32 of the camper extend to the laterally disposed sidewalls 34 positioned in generally planar relation to the sides of the pickup vehicle 14. The forward and uppermost portion 36 of the camper extends over the cab 38 of the vehicle. The outward transverse end of the camper has a door 40 to provide entrance and exit from the camper. The lateral sidewalls 34 of the camper have windows 42 and the forward upper transverse wall of the camper includes a window 44.

Referring to FIG. 2, a roof member 46, resembling a lid, caps the upper edge 50 of the camper body. As seen in FIG. 2, contact between the roof member 46 and the camper body illustrates the camper in a collapsed state.

Referring to FIG. 3, the roof member 46 is seen in an elevated position whereby bellows 52 are connected between the upper edge of the camper body and the roof member 46 providing a sealed enclosure. Telescoping jacks 58 connected at opposite ends between the roof member 46 and the shoulders 30 of sidewalls 34 are vertically adjusted to retain the roof member 46 in the elevated position. As will be noted, in the preferred embodiment of the present invention, a pair of these jacks are connected along each side of the camper to insure secure elevation of the roof member in a fixed position. The particular construction and operation of these jacks are discussed hereinafter.

Figure 4:
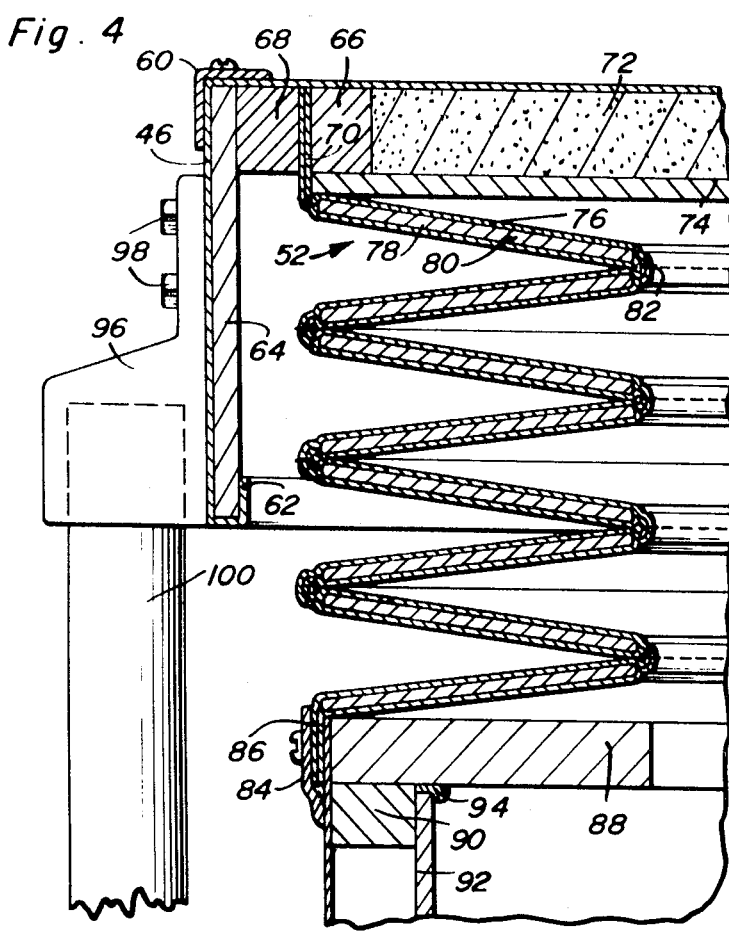
FIG. 4 is a partial sectional view illustrating the components of a roof assembly.
Figure 5:
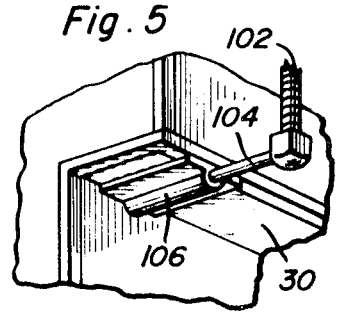
FIG. 5 is a perspective view illustrating a journal which supports the lower end of the jacks employed in the invention.

Referring to FIG. 4, the structural components of the roof assembly will be shown to include an outer inverted troughshaped shell having rigidifying strips 60 suitably connected along the upper peripheral edge of the roof member 46. The lower edge of the roof member is turned inwardly and upwardly to form a lip 62 which aids in securing a panel 64 against the lateral walls of the roof member. The upper peripheral corners of the roof member 46 include structural braces 66 and 68 disposed in adjacent relation contacting the top of the roof member and separated by a small space which receives the upper end edges 70 of the peripherally continuous bellows 52 having collapsible corners. A suitable insulating layer 72 is suitably mounted by means of cement or the like to the top of the roof member 46. A panel 74 is likewise secured to the lower surface of the insulating layer 72 thereby forming a laminated top or ceiling.

Each vertical segment or portion of the bellows 52 comprises two overlying sheets 76 and 78 and is fabricated from suitably resilient material. A slat or block of wood or like rigid material 80 is sandwiched between the sheets 76 and 78 to rigidify the bellows. Creases 82 are formed by heat sealing or cementing between the continuous sections of the bellows 52. The lower end portion 86 of the bellows 52 comprises overlying sheets 76 and 78 which overlie the exterior upper surface of the peripheral camper walls and are secured thereto by a mounting strip 84.

A frame 88 is suitably connected to the upper interior edge of the main camper body reinforced by structural braces 90 below the frame 88. A wall panel 92 is positioned against the braces 90 to present a finished appearance in the interior of the camper. A sealing strip 94 is peripherally mounted between the upper edge of panel 92 and the confronting surface of frame 88 thereby furnishing an additional seal against the elements of weather.

Considering the jacks 58, continuing reference is made to FIG. 4 wherein the upper tube 100 of the telescoping jack is normally retained within a receptacle 96 mounted to the lateral wall of roof member 46 by suitable fasteners 98. The lower disposed inner tube 102 is slidable within the upper larger tube and is connected at a lower end thereof in a right-angled coupling 104 journaled in a plate 106, the latter being suitably secured to shoulder 30. A collar 108 is disposed on the lower end of the larger tube 100 as seen in FIG. 3. A shaft extends from the collar and permits setting of each jack by a conventional internal jack mechanism (not shown).

In using the present camper, the jacks 58 are normally turned upwardly to engage the roof member. It will be noted that the jacks are located exterior of the camper so that it does not create an obstruction to individuals in the camper. When the camper is to be loaded or unloaded from the vehicle, the jacks 58 are pivoted downwardly until the lower end is placed into portable collapsible tripods 110. Then, a crank handle 112 on the shaft is turned until the jacks fully engage associated tripods 110. After all the telescoping supports are set, the vehicle 14 may ride out from underneath the camper in which case the camper is disposed above the ground as illustrated in FIG. 2.

By manipulating jacks 58, the vertical displacement between the telescoping members of each jack may be varied so that the roof member 46 is elevated as seen in FIG. 3. As the roof member is elevated, the bellows 52 expand providing a sealed enclosure for the camper.

Although a manual jack is shown and discussed, hydraulic or otherwise-powered jacks may be employed. Also, the roof structure may be used in buses, trailers and other vehicles.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A camper adapted to be hauled in a vehicle, said camper comprising a collapsible roof overlying sidewalls, the roof comprising a top member normally capping the sidewalls, an expandible extension peripherally disposed between the top member and the sidewalls for elevating the top member in a sealing manner, and expandible exterior support means normally connected between the top member and the sidewalls for selectively retaining the member in the elevated condition, the support means being rotatably mounted to the sidewalls for rotation between a downwardly extending position for jacking up the camper relative to the ground and permitting the vehicle to pull out from the resultant jacked-up camper and a normal position connecting to the top member for expanding and collapsing the expandible extension.

2. The structure set forth in claim 1, wherein the expandible extension is bellows shaped and is folded into the top member when collapsed.

3. The structure set forth in claim 2, wherein the expanded extension comprises overlying sheet material with creases formed in the sheet material to form hinges, the sections intermediate the hinges having plate members sandwiched therein for rigidifying the intermediate sections.

4. The structure set forth in claim 1, wherein the top member has receptacles mounted thereon for receiving a first end of each support means, a second end of each support means being journaled to the sidewalls to effect said rotatable mounting.

* * * * *